June 21, 1960

H. R. SMITH, JR 2,942,098

METHOD FOR HEATING MATERIALS BY ELECTRON
BOMBARDMENT IN A VACUUM

Filed Aug. 4, 1958

INVENTOR.
HUGH R. SMITH, JR.

BY

Lippincott, Smith & Ralls
ATTORNEYS

INVENTOR.
HUGH R. SMITH, JR.

BY

Lippincott, Smith & Ralls
ATTORNEYS

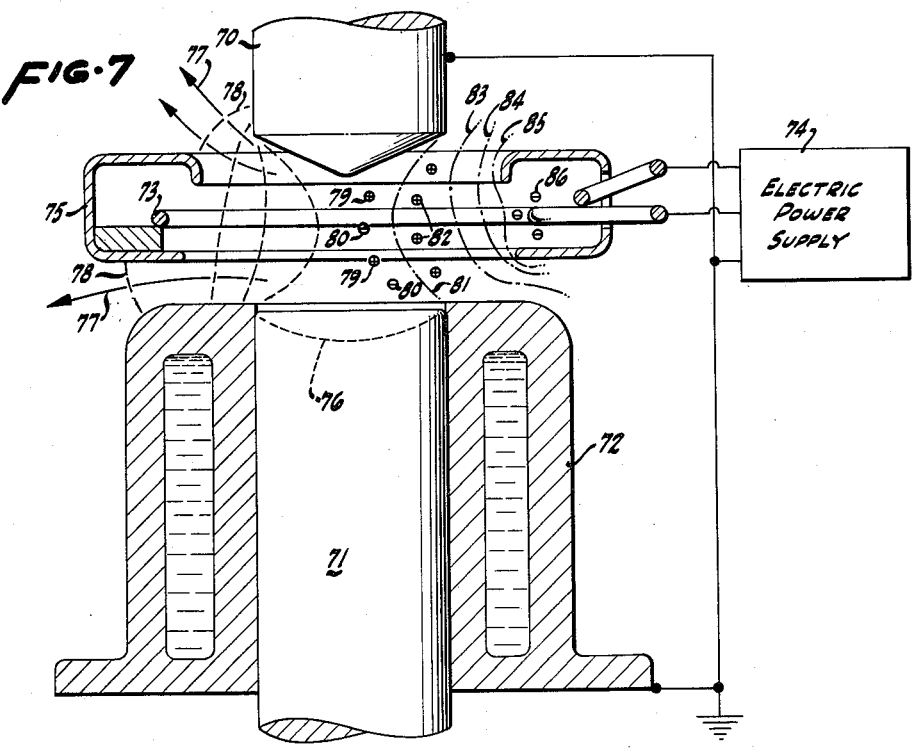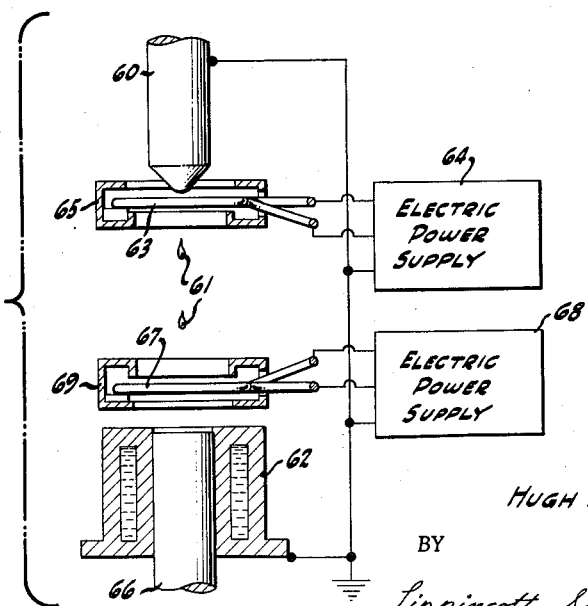

June 21, 1960  H. R. SMITH, JR  2,942,098
METHOD FOR HEATING MATERIALS BY ELECTRON
BOMBARDMENT IN A VACUUM
Filed Aug. 4, 1958  5 Sheets-Sheet 5

INVENTOR.
HUGH R. SMITH, JR.

BY

Lippincott, Smith & Ralls
ATTORNEYS

United States Patent Office 2,942,098
Patented June 21, 1960

2,942,098
METHOD FOR HEATING MATERIALS BY ELECTRON BOMBARDMENT IN A VACUUM

Hugh R. Smith, Jr., Berkeley, Calif., assignor to Stauffer Chemical Company, New York, N.Y., a corporation of Delaware Filed Aug. 4, 1958, Ser. No. 753,017

5 Claims. (Cl. 219—121)

This invention relates to the heating of metals and other materials in a vacuum, particularly for vacuum melting and casting, vacuum evaporation, and the like.

It is known that metals and other materials, after melting and casting in a high vacuum, have exceptional and useful properties different from those of the same materials processed at higher pressures. Also, certain materials having high chemical activities when in the molten state, such as titanium, cannot be melted and cast in conventional metallurgical furnaces, but can be processed successfully in properly designed vacuum furnaces. Other high-vacuum processes, such as the vacuum evaporation and deposition of materials to form films and coatings of great uniformity and low porosity, and chemical reactions at high temperatures and very low pressures, have considerable merit and importance. In all such high-vacuum processes, the supplying of sufficient heat to the material that is to be processed, while maintaining the requisite high vacuum, may present formidable difficulties. A general object of this invention is to provide an improved method for heating a body of metal or other material in a vacuum.

For small, laboratory-scale operations, particularly where high efficiency and low cost are not of paramount importance, the necessary heating is accomplished with relative ease by direct, high-voltage, electron bombardment of the material being processed. This type of heating has many advantages: a very high vacuum can be maintained (which is often necessary—e.g., for complete outgassing of the cast material in vacuum melting and casting apparatus—and which cannot be accomplished with an electric arc or a glow discharge, or other conventional heating means); and the material being processed can be heated to a much higher temperature than its container, which may be a water-cooled crucible or mold. For large, commercial-scale operations, however, adequate heating by electron bombardment is not accomplished so easily and, in fact, was not feasible prior to the present invention. One difficulty has been limitation of the electron current by the negative space-charge of the electronic discharge, which in turn limited the amount of electric power that could be supplied to the electron stream at reasonable voltages, and thus limited the thermal power that could be developed for heating purposes. Hence, another object of this invention is to provide a stable, high-voltage, high-impedance electron discharge wherein the current is not space-charge limited, and thus to achieve high-power, electron-bombardment heating of materials in large, commercial-scale melting and casting operations, and elsewhere.

According to the present invention, a substantial pressure gradient is maintained between the anode and the cathode of the electron-discharge system, with a considerably greater pressure (several orders of magnitude) in the vicinity of the anode than in the vicinity of the cathode. Preferably, for this purpose, the cathode structure is made annular and is disposed in alinement with and fairly close to the electron-bombarded anode. Gaseous matter is continually supplied to the interelectrode space in the vicinity of the anode, either by the evolution of gases and vapors from the bombardment-heated anode or by an auxiliary gas supply, and such gaseous matter is continually withdrawn from the vicinity of the cathode, e.g., by continuously pumping a high-vacuum tank containing the electrode structure, so that gaseous matter flows continuously from the vicinity of the anode through the annular cathode. Thus, a pressure gradient is provided through the space between the anode and the cathode, with the greatest pressure near the anode and a substantially lower pressure near the cathode. The annular cathode structure is sufficiently close to the anode (generally at a distance smaller than the cathode diameter) that the cathode is in a region of substantial pressure gradient.

By means of the aforesaid pressure gradient, a unique type of electric discharge is obtained. Ions are formed in the vicinity of the anode; and as electrons flow from the cathode to the anode, so positive ions flow from the ion-producing regions to the cathode structure. Thus, the negative space-charge of the electron stream is largely neutralized, or even over-neutralized, by the positive space-charge of the ion stream, and vastly greater current densities are obtained. At the same time, the pressure gradient through the discharge space makes it possible to avoid arcing and other forms of electrical breakdown, with a higher degree of space-charge neutralization, and at higher current densities, than has heretofore been possible under otherwise similar operating conditions.

The practice of this invention necessarily requires the use of certain apparatus, such as vacuum pumps and enclosures for producing high vacua, means for conveying and supporting materials that are to be processed, electron-emissive cathode structures, and electric power supplies. However, it should be understood that the apparatus may take numerous and varied forms, and that the apparatus herein illustrated and described is to be taken as merely illustrative of that which may be employed.

The foregoing and other aspects of this invention may be better understood from the following detailed description and the accompanying drawings. In the drawings:

Fig. 6 is a largely schematic, fragmentary, vertical section illustrating a modification of the aforesaid apparatus;

Fig. 7 is a largely schematic, fragmentary, vertical section illustrating another modification of the aforesaid apparatus;

Figure 1:
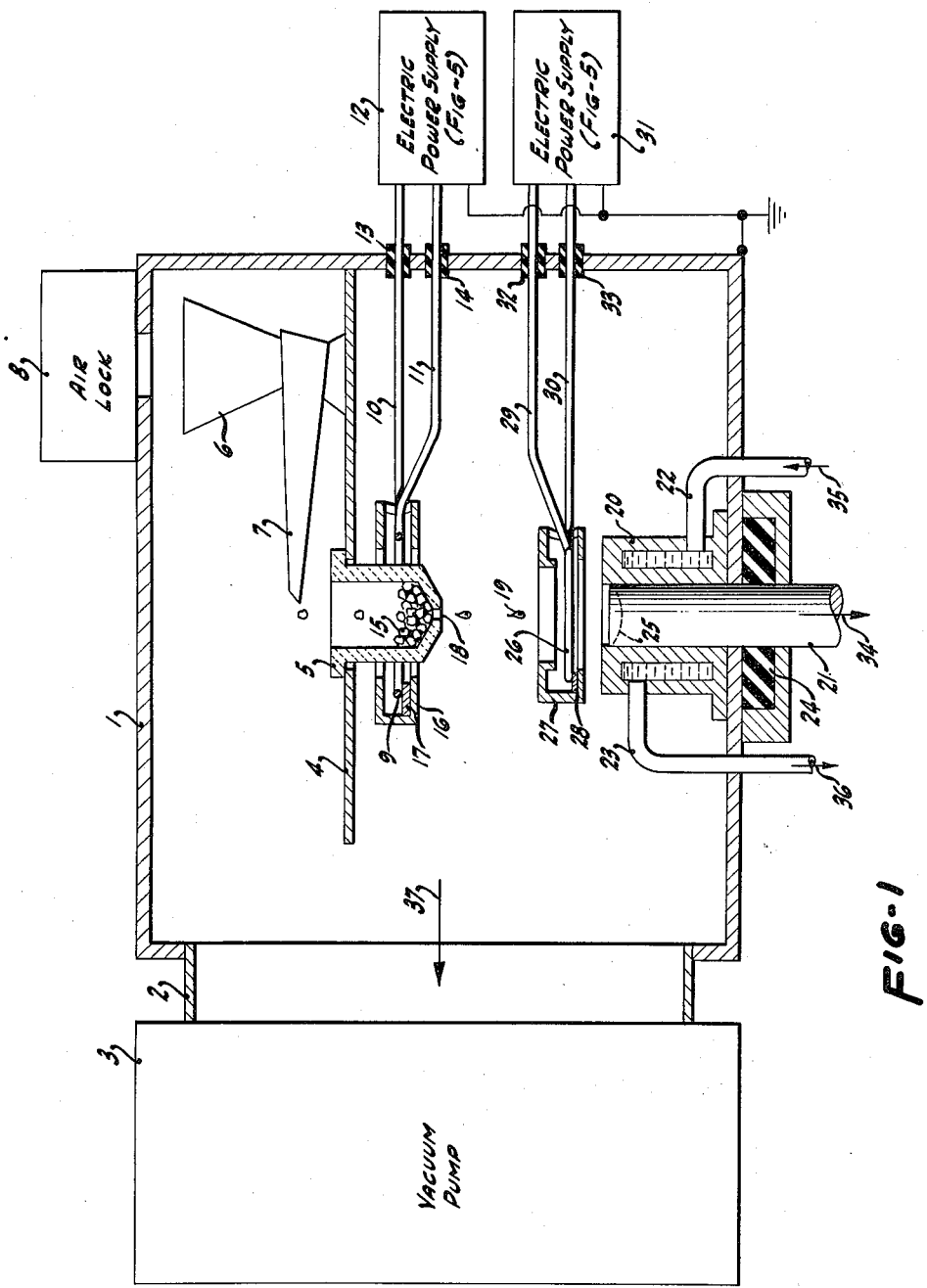
Fig. 1 is a largely schematic, vertical section of apparatus which may be used for the practice of the present invention.

Fig. 1 illustrates one apparatus which may be operated in accordance with the present invention for producing vacuum-cast ingots or rods from materials supplied in the form of spongy lumps. The apparatus comprises a vacuum tank or enclosure 1 connected, through a large-diameter duct 2, to a high-capacity vacuum pump 3, which may include a large (e.g., 32 inch diameter) oil-diffusion pump together with the appropriate fore pumps and supervisory apparatus. The vacuum pump 3 should have sufficient capacity, and the duct 2 should be sufficiently large, for maintaining within tank 1 generally an absolute pressure of one-tenth micron of mercury or less during operation, while large amounts of gases and vapors are being evolved from the material being processed. Inside the vacuum tank, a horizontal platform 4 supports a melting crucible 5, a hopper 6 for storing a supply of the spongy, lump material that is to be melted and cast, and a conventional feed mechanism 7 operable to convey lumps of said material from hopper 6 into crucible 5. An air lock 8 is provided for refilling hopper 6 from time to time.

Crucible 5, which is electrically conductive, extends downward through a hole in platform 4, as shown, and is electrically connected to ground through platform 4 and the metal walls of tank 1. An annular, filamentary, thermionic cathode 9, which may be a loop of tungsten wire, extends around a lower portion of crucible 5. Respective ends of the filamentary cathode 9 are connected through two leads 10 and 11 to an electric power supply 12. Insulators for passing the leads through the walls of the vacuum tank are indicated at 13 and 14. The power supply 12 supplies sufficient current through leads 10 and 11 for heating filament 9 to produce a copious thermionic emission of electrons. Power supply 12 also maintains the entire filament 9 at a high negative potential, 15,000 volts for example, relative to crucible 5, so that electrons emitted by cathode 9 bombard crucible 5 and heat the crucible sufficiently to melt the material 15 therein. An annular focusing shield 16, having a cross-section shaped as an inwardly opening channel, surrounds cathode 9 for directing the electrons inward toward crucible 5 and for preventing substantial bombardment of other parts such as platform 4 and the walls of tank 1. Preferably, shield 16 is connected to cathode 9 by a metal block or strap 17, which maintains the shield at cathode potential and also helps to support the filamentary cathode.

There is a small aperture 18 at the bottom of crucible 5 so that material 15 drips out of the aperture 18 substantially as fast as the material melts. Drops of the molten material are indicated at 19. The molten material falls into an annular, water-cooled mold 20 where it solidifies into a solid rod or ingot 21. Preferably, mold 20 is made of copper or other material having a high thermal conductivity. Pipes 22 and 23 represent means for circulating water or other coolant through the mold to keep the mold relatively cool. As additional material is added to the top of the ingot 21, the ingot may be withdrawn through a conventional vacuum seal 24 and cut off into appropriate lengths, or utilized in any manner desired. The molten material at the top of ingot 21 forms a pool supported in a saucer or skull of the solidified material, as is indicated by the broken line 25, whereby there is but little contact of the molten material either with mold 20 or with crucible 5, which permits the handling of materials that have high chemical activities when in the molten state.

For the production of sound, highly devolatilized, nonporous ingots, it is necessary that considerable heat be supplied to the molten pool supported at the top of ingot 21. This, too, is accomplished by electron bombardment. The molten pool, which acts as an anode, is electrically connected to ground through copper mold 20 and the metal walls of the vacuum tank. Even such a material as quartz, usually considered a good electrical insulator, has sufficient electrical conductivity in the molten state to permit effective heating of the molten material by electron bombardment of the molten pool as an anode. Hence, the process herein described is not limited to metals and the like, although it is admirably suited to the melting and casting of many metals.

Electrons to bombard the molten pool are supplied by an annular cathode structure disposed just above and in alinement with the top of the mold 20. This last-mentioned cathode structure comprises an annular, filamentary, thermionic cathode 26, which may be a loop of tungsten wire, situated within an annular focusing shield 27. Shield 27 has an inwardly opening, generally channel-shaped cross-section, as shown, and it is connected to filamentary cathode 26 by means of a metal strap or bar 28, which maintains the shield 27 at cathode potential and helps to support the filamentary cathode. Respective ends of filamentary cathode 26 are connected through leads 29 and 30 to an electric power supply 31. Insulators for passing leads 29 and 30 through the wall of vacuum tank 1 are indicated at 32 and 33. Power supply 31 supplies current through leads 29 and 30 for heating filament 26 to produce a copious thermionic emission of electrons, and the power supply also maintains the entire filament 26 at a high negative potential, 15,000 volts for example, relative to the pool of molten material at the top of ingot 21. Electrons emitted by cathode 26 are accelerated to high-velocities by the applied high voltage, and heat the pool of molten material by electron bombardment.

In the drawing, the apparatus has been simplified by the omission of heat shields, supporting members, and the like, which can readily be supplied by those skilled in the art. It is evident that liquid cooling of focusing shields 16 and 27, and any other parts of the structure which might become excessively heated, may readily be provided whenever such is found to be desirable. Such details are considered superfluous to a description of the present invention, which is not primarily concerned with the apparatus, but with methods and the manner and conditions of operation. Hence, for present purposes the structural details of the apparatus are immaterial, except insofar as they affect the mode and conditions of operation as herein described.

In Fig. 1, arrow 34 is intended to indicate that ingot 21 may be lowered from time to time, by withdrawing a portion of the ingot through vacuum seal 24, to keep the pool of molten material at the top of ingot 21 near the top of mold 20. Arrows 35 and 36 are intended to indicate the circulation of coolant through mold 20 via pipes 22 and 23. Arrow 37 is intended to indicate the continuous pumping of gaseous matter from vacuum tank 1 by vacuum pump 3 for maintaining a high vacuum within the vacuum tank during operation, while gases and vapors are being evolved from the material that is processed.

The heating of crucible 5 takes place in a fairly straightforward manner by electron bombardment from cathode 9. In this case, the cathode is reasonably well shielded from the evolved gases and vapors and it is not unduly difficult to maintain a stable discharge. Any tendency toward arcing or other forms of breakdown is controlled by the use of a high-impedance power supply at 12, which quickly reduces the applied high voltage whenever excessive currents develop. Preferably, the heating of crucible 5 is regulated by controlling the emission current of cathode 9, which may be done by controlling the filament current supplied through leads 10 and 11. Stabilizing the discharge between cathode 26 and the pool of molten material at the top of ingot 21 is much more difficult, and the manner of accomplishing this will be now described in considerable detail.

In electron-bombardment heating of materials, gases and vapors within the electron-discharge system may become ionized and, even in a fairly good vacuum, positive ions so formed may effect an appreciable neutralization of the negative space-charge of the electron stream. While this permits the existence of a larger electron current, it introduces other problems and difficulties, especially with respect to stability of the discharge. Specifically, as the number of ions increases, there is an increasing tendency for an arc or a glow discharge to form, either between the primary electrodes (the electron-emissive cathode and the anode, which is the material being bombarded), or between one of these electrodes and other structural parts such as the walls of the vacuum tank. At high melting rates this problem is aggravated by the fact that the molten material usually evolves, in addition to vapors of such material, considerable quantities of absorbed and adsorbed gases, which are not liberated at a uniform rate, but in varying amounts and in sudden bursts. Also, there may be considerable splatter of the molten material, which may produce ions, and may also contaminate the cathode and other structures so as to produce localized regions or spots that emit electrons profusely—an ideal condition for arc-formation and other types of electric breakdown.

Under such conditions, unless controlled in the manner herein set forth, there is a continuing, high probability for the formation of an uncontrolled, low-resistance, self-sustaining discharge that will make impossible the maintenance of the desired operating conditions. Because of these instability problems, it has not been feasible, prior to the present invention, to employ space-charge neutralization for increasing the electron current to the extent necessary for the use of electron-bombardment heating in large, commercial-scale, melting and casting operations. On the contrary, it was necessary to limit the melting rate, and to place the cathode at such a distance from the molten material, that the electron current was limited to small values by negative space-charge within the vicinity of the cathode. Hence, heretofore, only small, laboratory-scale operations could be performed with electron-bombardment heating, and such operations could process only small quantities of material at high cost.

The present invention solves the aforesaid instability problems by a combination of several novel expedients, of which a crucial one is the establishing and maintaining of a pressure gradient through the space between the anode and the cathode. To this end, gaseous matter is continually supplied into the interelectrode space in the vicinity of the anode—e.g., by the evolution of gases and vapors from the anode—and is continually removed from the vicinity of the cathode by operation of the vacuum pump, which withdraws gases and vapors through the annular cathode structure, and by the condensation of vapors on the cooler parts of the cathode and shielding structures.

When the gaseous matter supplied to the interelectrode space consists chiefly of gases and vapors evolved from the bombardment-heated anode, the rate at which such gaseous matter is supplied can be regulated to a considerable extent by controlling the electric power supplied to the electron discharge, and thus controlling the rate at which heat is supplied to the anode. In any event, the rate at which said gaseous matter is supplied is regulated and kept in such relation to the vacuum pumping rate that the pressure at the anode is at least an order of magnitude (10 times) greater than the pressure at the cathode, while the average gas density within the interelectrode space is kept so low that a substantial majority of the electrons flowing from the cathode to the anode experience no ionizing collisions with said gaseous matter. Thus, the primary electrons produce few ions, and such ions as they do produce are mostly produced near the anode where the gas density is greatest. More ions are produced by secondary and thermionic electrons emitted from the anode, and these ions too are mostly produced near the anode. Thus, the cathode is a supplier of electrons, and a region near the anode is a supplier of positive ions. In general, the ion density will vary as a direct function of both the electron current and the density of the gaseous matter.

The ionic density near the anode may become sufficiently great to form an ionic plasma—a highly ionized region of high electrical conductivity and substantially neutral electric charge. This plasma extends outward from the anode toward, but not to, the cathode. Since the plasma is a good conductor of electricity, the entire plasma assumes an electric potential that is but slightly different (less than about 50 volts) from the potential of the anode, and the plasma becomes a virtual anode for the electron discharge—an anode so tenuous that few of the primary electrons collide with particles within the plasma. Most of the primary electrons pass directly through the plasma, and they bombard and heat the molten surface of the real anode. Gas focusing concentrates the electron stream onto the molten surface from which the gaseous matter evolves, and distributes the electron bombardment over said surface so that the molten surface is heated in a substantially uniform manner while little power is lost in bombardment of relatively cool surfaces, such as the surface of the water-cooled mold.

The plasma is surrounded by a sheath of positive-space charge and most of the applied voltage appears across the space between this sheath and the cathode. This sheath differs somewhat from the better-known ion sheaths of other electric discharges in that the present sheath is more dynamic in nature: the pressure and density gradients in the discharge region cause a continual flow of matter through the sheath; and thus the ions, subject to fluid flow as well as to thermal motions and electrical forces, continually move outward through the sheath and are replaced by ions continually flowing outward through the plasma to provide a region of dynamically maintained positive space charge. With these distinctions in mind we may, for convenience, now refer to the space-charge region surrounding the plasma as a positive ion sheath.

Electrons moving from the cathode to the anode are accelerated to high velocities by the applied voltage, which may be in the order of 10 to 20 thousand volts, and generate considerable thermal power as they bombard the anode. Positive ions move from the ion sheath toward the cathode structure, and substantially neutralize, or even over-neutralize, the negative space-charge of the electron stream. Hence, the electron current is not space-charge limited, but increases to a saturation value limited by the emission of the cathode. Thus, the electron current can be controlled by regulating the emission of the cathode—in practice this is accomplished by employing a filamentary, thermionic cathode with the filament heating current controlled to control the emission current.

The pressure gradient herein described is vital to the stability of the highly neutralized, electron discharge employed for heating the anode. Without this gradient the plasma and its surrounding ion sheath would tend to move ever closer to the cathode structure, and the development of any localized current concentration, or a transient, rising gas density due to release of a sudden burst of gas from the anode, would cause arcing or other forms of electrical breakdown by bombarding some portion of the cathode structure with a sufficient number of positive ions to initiate a self-sustaining, low-voltage discharge. While the use of a high-impedance voltage source is helpful to extinguish arcs so formed, and preferably is used in conjunction with the present invention, such a source alone, without the pressure gradient, is not adequate for controlling the high-power discharges achieved and stabilized with the pressure gradient.

The effectiveness of the pressure gradient in stabilizing the discharge is believed to be due to its effect on the ion-density distribution. Because of the smallness of the voltage gradient within the plasma, the speed of ion migration is correspondingly low, and the local ion density is approximately proportional to the density of the gaseous matter. Ions constituting a positive ion sheath surrounding the plasma are supplied from the fringes of the plasma, and any positive ions that penetrate the ion sheath are quickly drawn to the cathode structure by the relatively large voltage gradient existing between the ion sheath and the cathode. Thus, as the plasma expands toward the cathode structure the ion densities decrease in the fringes of the plasma, and in the ion sheath, so that fewer ions are supplied to bombard the cathode and to neutralize the negative space-charge of the electron stream.

Hence, the plasma is a self-regulating ion source and, with a constant electron current, the ionic current and the positive space-charge decrease with expansion of the plasma. This characteristic, unlike that of an arc or other low-resistance discharge, inhibits over-expansion of the plasma and stabilizes the discharge at current densities and at gas pressures far in excess of those existing at the limit of stability in prior, high-voltage, electric discharges. Furthermore, the pressure gradient, and the consequent thinness of the high-pressure region in the vicinity of the anode, increases the escape probability of gas molecules evolved from the anode, and outgassing of the anode material proceeds much more rapidly and more completely than would be expected from the local pressures existing at the anode surface.

Figure 2:
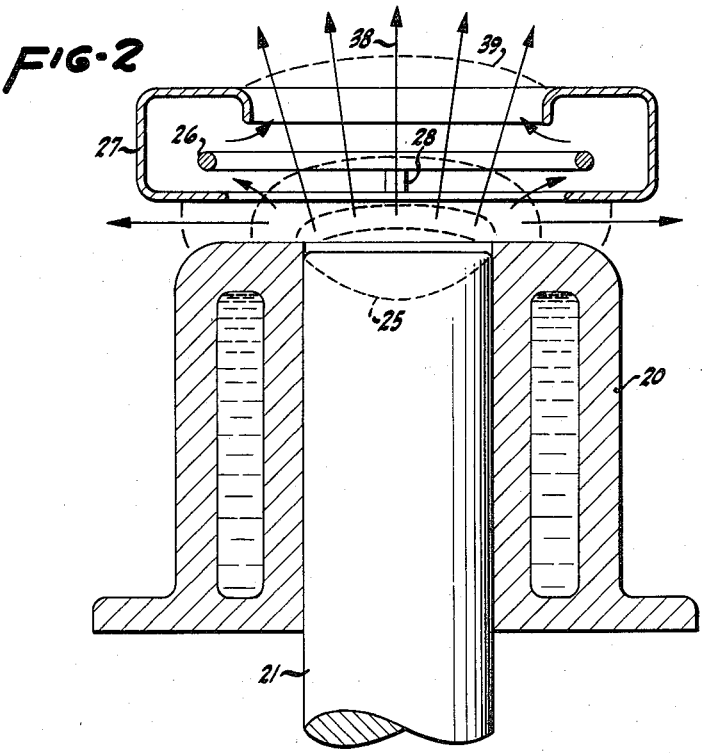
Fig. 2 is a fragmentary, vertical section, showing a portion of the same apparatus and illustrating typical flow and pressure distributions existing during operation in accordance with this invention.

Fig. 2 is a detail drawn to a larger scale, showing the water-cooled mold 20 and the associated cathode structure of the Fig. 1 apparatus. By way of example, ingot 21 may be one and one-half inches in diameter, cathode 26 may be a three-inch diameter loop of tungsten wire, and other dimensions of the structure may be in proportion to these diameters, approximately as shown. The aforesaid dimensions have been employed very effectively for the processing of titanium and the like, although they are not necessarily ideal for other materials. In general, a material that evolves greater amounts of gaseous matter during processing may require a larger-diameter cathode structure spaced a somewhat greater distance from the anode. Also, larger furnaces may be built for producing larger ingots. Apparatus for casting ingots three inches in diameter has been quite successful, wherein the other dimensions of the structure are increased approximately in proportion to the increase in ingot diameter.

It will be noted that the annular cathode structure is in direct alinement with and fairly close to the anode—in general, the optimum anode-to-cathode spacing is usually less than the diameter of the cathode. The molten pool of material, which constitutes the anode, evolves considerable quantities of gaseous matter, comprising both vapors of the material being processed and gases absorbed or adsorbed by such material during previous processing at higher pressures. Thus, there is a continual flow of gaseous matter from the top of mold 20 outward in the vacuum tank, and a major portion of this gaseous matter flows through the annular cathode structure. There is, of course, a pressure drop in the direction of flow. Fig. 2 illustrates a typical flow and pressure pattern, wherein arrows 38 represent the general direction of flow and broken lines 39 represent constant-pressure contours.

An important aspect of the heating process according to this invention is the regulation and correlation between the rate at which gaseous matter is supplied to the interelectrode space in the vicinity of the anode, as by the evolution of gases and vapors from the anode, and the rate at which gaseous matter is withdrawn from the vicinity of the cathode by operation of the vacuum pump. Preferably, the vacuum pump should have a sufficiently high capacity to maintain a high vacuum, generally less than about one-tenth micron of mercury, throughout the region surrounding and lying substantially outside of the electrode structure illustrated. Hence, once a particle of gaseous matter passes the outermost broken line 39, there is little probability for its return to the discharge region.

Within the space that is substantially surrounded by the electrode structure, there is a pressure gradient having a magnitude that depends upon the rate at which gaseous matter is evolved or otherwise supplied into the vicinity of the anode. In general, the rate at which gaseous matter is evolved from the anode can be regulated by controlling the supply of molten material and by controlling the generation of heat at the anode surface. The first control is effected by controlling the amount of electric power supplied to the upper discharge system of the Fig. 1 apparatus, thereby controlling the rate at which the material is melted in crucible 5. The second control is effected by controlling the amount of electric power supplied to the discharge between cathode 26 and the anode surface at the top of ingot 21. In processes according to this invention, and in sharp distinction to small, laboratory-scale electron-bombardment heating, both the supply of molten material and the generation of heat at the anode surface occur at such high rates, and thereby gaseous matter is evolved in such quantity, that the pressure in the vicinity of the anode is at least an order of magnitude (10 times) greater than the pressure maintained outside the electrode structure by the vacuum pump. Thus, there is a substantial pressure gradient outward from the anode, and the cathode is sufficiently close to the anode, relative to the anode diameter, that the cathode also lies in a region of substantial pressure gradient. In the electrode geometry, the ratio between the anode-to-cathode spacing and the anode diameter is highly significant. In proceeding from small-scale to large-scale operations, the anode-cathode distance may remain essentially constant; but as the scale of operations increases, the large-diameter anodes required and the increased gas evolution necessitate new techniques for stabilizing the electrical discharge, as herein explained.

Even though a relatively high pressure exists immediately above the top of ingot 21, outgassing of the molten material proceeds at a rapid rate because of the steep pressure gradient and the relative thinness of the high-pressure zone. In other words, the escape probability for particles of the evolved gaseous matter remains reasonably high, despite the local high-pressure zone. Even through frequent collisions between gas and vapor particles occur in the immediate vicinity of the anode, which may drive a portion of the evolved matter back into the anode, a large proportion of the evolved matter soon reaches a region of such low pressure that the probability of its return to the anode is negligible.

A substantial pressure gradient is thus provided through all of the space between the anode and the cathode. Nevertheless, because of the relatively small distance between the cathode and the anode and the high rate of evacuation by the vacuum pump, the average density of gaseous matter within the interelectrode space is kept so low that a large majority (probably much more than 90 percent) of the electrons that travel from the cathode to the anode do so without colliding enroute with any particle of gaseous matter, and an even larger percentage of the primary electrons make the trip from cathode to anode without ionizing any gas or vapor particles. The relatively few primary electrons that do collide with particles of gaseous matter have such high energies, several thousand electron volts, that the ionizing cross-section—the probability of a collision producing an ion—is extremely small. Consequently, the production of ions by direct action of the primary electrons is small, and probably quite negligible. Such ions that are produced are mostly produced in the vicinity of the anode where the gas density is greatest.

On the other hand, numerous low-velocity electrons are emitted from the anode, by secondary emission upon bombardment by the primary electrons, and by thermionic emission due to the high temperature of the molten anode. These low-velocity electrons seldom have velocities exceeding about 50 volts, and therefore the electric field substantially prevents their traveling beyond the minus 50-volt equipotential contour. The low-velocity electrons tend to remain in the vicinity of the anode, and are able to produce many ions in the vicinity of the anode. In fact, sufficient ionization may take place to form an ionic plasma extending outward from the anode toward, but not to, the cathode.

The plasma is a good electrical conductor, and it forms a virtual anode for the electron stream emitted by the cathode. Positive ions migrate outward from the fringes of the plasma; not only by thermal motion and under the influence of the small voltage gradient in the plasma, but also due to the pressure gradient and the flow of matter outward from the anode, as herein described, and the positive ions in passage through the region surrounding the plasma form a positive space-charge layer or ion sheath surrounding the plasma. Most of the applied high voltage now appears between this ion sheath and the cathode structure. However, the plasma is so tenuous that a majority of the primary electrons still pass through the plasma to the molten pool without experiencing collisions enroute. An effective gas focusing develops, which guides the high-velocity electrons to the molten pool and minimizes loss of energy through undesirable bombardment of the mold 20 and other relatively cool parts.

Figure 3:
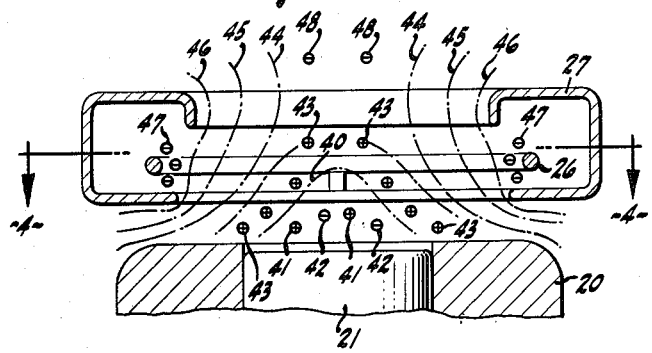
Fig. 3 is a fragmentary, vertical section, showing a portion of the same apparatus and illustrating typical electric field and ion distributions existing during operation in accordance with this invention.
Figure 4:
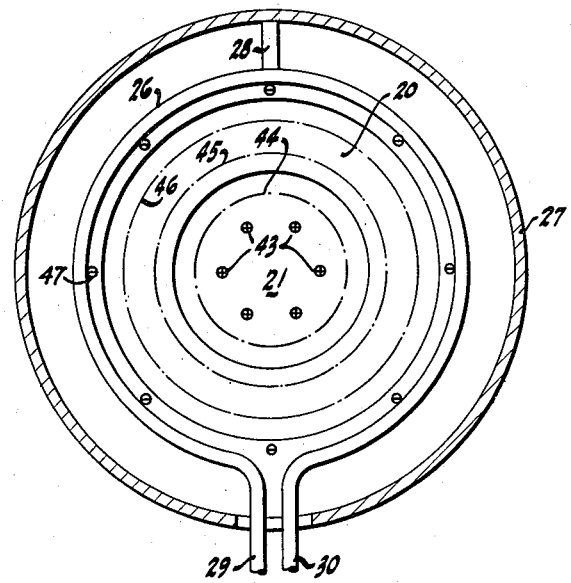
Fig. 4 is a transverse section taken along the line 4—4 of Fig. 3.

Fig. 3 illustrates a typical electric field and ion-density pattern. The broken lines in Fig. 3 represent equipotential contours, and the small circles, containing plus and minus marks, represent the approximate electric-charge distribution—that is, regions wherein circles containing minus signs predominate are regions of net negative space-charge produced by negative ions and electrons; regions wherein circles containing plus signs predominate are regions of net positive space-charge produced by positive ions; and regions wherein there are approximately equal numbers of circles containing plus and minus signs are plasma regions of approximately neutral space-charge.

Thus, between anode 21 and the minus 50-volt equipotential contour 40, there is an ionic plasma comprising positively charged particles 41 and negatively charged particles 42. Surrounding this plasma, just outside the conical equipotential contour 40, there is a positive ion sheath comprising a predominance of positively charged particles 43. Most of the applied high voltage appears between this ion sheath and the annular cathode structure, as is indicated by equipotential contours 44, 45, and 46, wherein the contour spacing is approximately 3500 volts. Closely surrounding the cathode 26 there may be a thin sheath of predominately negative space charge comprising a cloud of electrons 47 loosely bound to or flowing outward from the cathode surface.

Thermal velocities and the pressure gradient carry some ionized particles upward from the plasma through the annular cathode and shielding structure. Because the electric field attracts the positive ions to the cathode structure, the annular cathode structure acts somewhat as an ion filter that removes positive ions from the gas stream. Hence, the region above the cathode structure has a net negative space charge, as is indicated by the circles 48.

Under the influence of the electric field, electrons move from the cathode toward the ion sheath and are accelerated to high velocities. The gaseous matter within the interelectrode space is kept so tenuous by the constantly operating, high-capacity, vacuum pump that few of these primary electrons collide with particles of the gaseous matter either before or after they enter the ionic plasma. Consequently, the primary electrons move through the plasma at high velocities, and generate considerable thermal power as they bombard the top of anode 21. Consequently, a molten pool of material is provided and maintained at anode 21, and numerous low-velocity electrons are emitted from this pool both by thermionic emission due to the high temperature of the molten material and by secondary emission due to bombardment of this material by the high-velocity primary electrons.

Because the voltage gradient within the highly conductive plasma is small, the low-velocity electrons may wander about within the plasma for a time, and may produce both positive and negative ions by collisions with particles of gaseous matter. Excess negative charges return to the anode, so that the net space charge of the plasma is substantially neutral, while the electrical conductivity of the plasma is high due to the relatively high degree of ionization existing therein. Consequently, the plasma as a whole assumes an electric potential differing but slightly (generally less than 50 volts) from anode or ground potential. The size of the plasma tends to adjust itself to the rate of ion formation, and as the ionization rate increases, the plasma grows and expands outward from the anode toward the cathode structure.

The electric field prevents any substantial migration of negative ions from the plasma toward the cathode structure. Positive ions can migrate outward from the plasma, and as such ions enter a region of large voltage gradient they are accelerated and move rapidly toward the cathode structure. Thus, there is an electron current from cathode 26 to the plasma, and a positive ion current from the plasma to cathode 26 and focusing shield 27. Within any small portion of the current paths, the negative space charge is directly proportional to the magnitude of the electron current and inversely proportional to the velocity of the electrons, while the positive space charge is directly proportional to the positive ion current and inversely proportional to the positive-ion velocities. Because of their much greater masses, the positive ions move much more slowly than the negative electrons. Hence, even though the positive ion current is considerably smaller than the electron current, the net space charge is substantially neutral or even positive throughout most of the region between the cathode and the plasma region. An exception may be a very thin electron sheath in the immediate vicinity of cathode 26.

At the low current-densities employed in prior electron-bombardment heating systems, and in the present apparatus during start-up before sufficient ionization has occurred for space-charge neutralization, the negative space-charge around the cathode could be sufficiently great in magnitude and extent to limit the electron current. But, when operating at high current densities under the conditions provided in accordance with the present invention, the negative space-charge layer is too small to limit the current substantially, and the electron current is limited only by the emission of cathode 26.

Low-velocity positive ions migrate outward from the fringes of the plasma, as hereinbefore explained, and form the positive ion sheath that surrounds the plasma. As these ions enter the strong electric field between the cathode structure and the plasma, the positive ions are accelerated by the field, and move with increasing velocities toward the cathode structure. It is evident that the positive ion current is limited only by the supply of ions available at the fringes of the plasma and in the ion sheath. This supply is self-regulated in a manner that will now be explained.

At start-up, when the electric power supply is first turned on, the rate of ionization is small and the electron current is limited by its own negative space-charge. A plot of voltage versus distance across the cathode-anode space will produce the concave-upward, more or less parabolic curve typical of a vacuum diode. As the anode becomes heated and begins to evolve considerable quantities of gaseous matter and to emit substantial numbers of low-velocity electrons, a supply of ions, which may become a plasma, develops in the vicinity of the anode. If the cathode structure is kept a sufficiently great distance away from the anode, in accordance with prior practice, the ions so produced can neutralize only a part of the negative space-charge, and stability of the discharge is maintained by space-charge limitation of the electron current. However, with the cathode structure placed relatively close to the anode, as herein described, space-charge neutralization proceeds to a point where the negative space-charge is no longer effective to limit the current, and the electron current is then limited solely by the emission of cathode. Consequently, high current densities are obtained, but at the same time stability problems arise which heretofore have prevented operation of a high-voltage discharge at such current densities and comparable gas pressures.

More specifically, each increase in current produces a more than proportional increase in the rate of ion generation, and a plasma tends to grow and to spread outward from the anode toward the cathode structure. Because the plasma is a good conductor, the plot of voltage versus distance now has an almost horizontal portion, extending through the plasma region and at a value near the anode voltage, while the curve representing voltage between the cathode and the plasma, being compressed into a smaller distance, becomes progressively steeper. Hence, there is a greater voltage gradient near the cathode, and the cathode current increases up to the saturation value set by cathode emission. As the plasma continues to expand and approaches the cathode structure, the emission of electrons from the cathode and shielding structures tends to increase independently of the filament current supplied to the cathode, because of bombardment by positive ions and possibly other factors as well, e.g., field emission due to increased voltage gradients in the vicinity of the cathode. Hence, there is a tendency toward a negative-resistance characteristic with a high probability for arc formation and other forms of electrical breakdown.

According to the present invention this instability is overcome by means of the pressure gradient provided by the methods of operation herein described. Because of this pressure gradient, there is a gradual tapering-off of the ionic densities within the plasma, from a high density in the immediate vicinity of the anode to a lower density near the fringes of the plasma. Thus, as the plasma expands the supply of ions at the fringes of the plasma decreases, and thus expansion of the plasma provides fewer, rather than more, positive ions for bombarding the cathode structure. By this means, stability is achieved with a cathode structure disposed sufficiently close to the anode for complete cancellation of the limitation of current by negative space-charge; and stable, high-voltage electron discharges can be maintained at current values far in excess of those heretofore possible for like purposes and under otherwise similar operating conditions.

At maximum current, there may still be some tendency for localized arc-formation and sparking, especially when the material being processed is one that may evolve gaseous matter in sudden bursts of considerable magnitude, or one that is particularly subject to splattering. However, when operating according to the principles herein disclosed, these localized arcs can be controlled by techniques that would not be effective if used alone. For example, the high-voltage power supply preferably is of a type having poor regulation, so that any sudden, abnormal increase in the discharge current causes a rapid decrease in the applied high voltage. Also, the filament current may be automatically controlled to reduce the filament emission until stable conditions are re-established.

Figure 5:
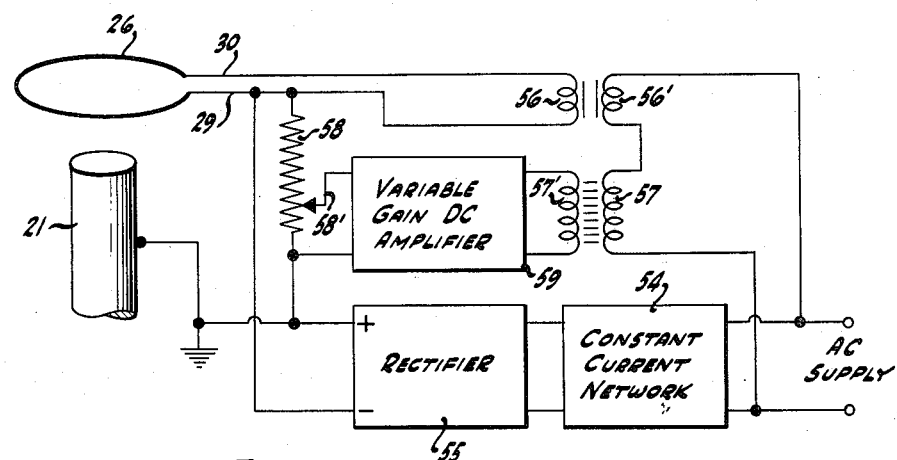
Fig. 5 is a schematic, circuit diagram of a typical electric power supply used in the apparatus of Fig. 1.

One type of electric power supply capable of meeting these requirements is illustrated schematically in Fig. 5. Alternating current from any available source is supplied through a constant-current network 54 to a rectifier 55. The positive output terminal of rectifier 55 is connected to anode 21, which usually is grounded, and the negative output terminal of the rectifier is connected to cathode 26, so that a high D.C. voltage (e.g., about 15 thousand volts) is provided between the anode and the cathode. However, this is not a constant voltage, but one that varies inversely with the load imposed upon the power supply. Such variations are accentuated by the constant-current network 54. Thus, during start-up, current is small because of negative space-charge, and consequently the applied high voltage is greater than during normal operation, which helps to overcome the space-charge limitation of the current. Whenever an arc starts to form, an increase in current is inhibited by the constant-current network, and the applied high voltage drops quickly to a small value.

Cathode 26 is heated by alternating current supplied through leads 29 and 30 from the secondary 56 of a filament transformer. The primary 56' of the filament transformer is connected in series with a saturable reactor 57 to the alternating current supply mains. Direct current supplied to a control winding 57' of the saturable reactor controls its impedance, and thereby controls the temperature of cathode 26.

A voltage divider 58 is connected across the high-voltage supply, as shown. An adjustable tap 58' on this voltage divider is connected through a variable-gain, D.C. amplifier 59 to the control winding 57'. Thus, when the voltage between anode 21 and cathode 26 increases, more current is supplied to control winding 57', the impedance of reactor 57 is decreased, and more current is provided to heat filament 26. As the filament's temperature rises, its emission of electrons increases, and the impedance of the electron discharge is reduced. Conversely, when the anode-to-cathode voltage decreases, the filament heating current is automatically decreased for increasing the impedance of the electron discharge. Tap 58' and the gain of amplifier 59 are adjusted until a stable control characteristic is achieved. Then, the emission of electrons by the cathode is automatically regulated to maintain in the vicinity of the cathode an ion density sufficient for substantially neutralizing the electronic space-charge but insufficient for producing a self-sustaining discharge.

This invention is not limited to apparatus wherein the material processed is melted in a crucible. Fig. 6 is a fragmentary, largely schematic illustration of apparatus for melting rod stock, which is to be recast into another ingot or rod. The purpose of such melting and recasting may be, for example, to achieve devolatilization and purification of the material by melting and casting in a high vacuum. In the embodiment illustrated in Fig. 6, the vacuum tank, pumps, etc., may be identical to corresponding parts of the Fig. 1 apparatus, and therefore such parts are not illustrated in Fig. 6.

The material which is to be processed is supplied in the form of an ingot or bar 60, which is electrically grounded through its supports (not shown). The lower end of rod 60 is melted by electron bombardment, and drops 61 of the molten material fall into an annular, water-cooled, copper mold 62. Electron bombardment heating and melting of rod 60 is accomplished by means of an annular cathode 63, connected to an electric power supply 64 and disposed within an annular focusing shield 65. The molten material solidifies in mold 62 and forms a rod or ingot 66, which may be withdrawn through the bottom of the annular mold. Electron bombardment heating, as hereinbefore described, is used to maintain a pool of molten material at the top of ingot 66. For this purpose there is provided an annular cathode 67, connected to an electric power supply 68 and disposed within an annular focusing shield 69.

The lower electron-bombardment system 67–69, for heating the pool of molten material at the top of ingot 66, is substantially identical in structure and operation to the electron-bombardment system hereinbefore described in connection with Figs. 1 through 5. The upper electron-bombardment system 63–65, for heating the lower end of rod 60, is a substantial replica of the lower bombardment system, inverted so that the anode is above the cathode rather than below it. This upper bombardment system also is operated in accordance with the principles of this invention, and substantially as hereinbefore described.

It is possible to use the same cathode structure both for bombardment-heating and melting of the bar stock and for bombardment-heating of the molten pool atop the cast ingot. This is illustrated in Fig. 7, wherein the material that is to be processed is supplied in the form of a bar 70; and the finished casting is withdrawn in the form of a bar or ingot 71 from the bottom of an annular, water-cooled, copper mold 72. The electron-bombardment system comprises an annular cathode 73, connected to an electric power supply 74 and disposed within an annular focusing shield 75. Some of the electrons emitted by cathode 73 flow upward and bombard, heat, and melt the lower end of rod 70; and some of the electrons emitted by cathode 73 flow downward and bombard and heat a pool of molten material 76 at the top of ingot 71. The division of electric power between the two anodes, and thus the ratio of heat generated at the two anodes, is controlled by adjusting the position of rod 70 relative to the cathode structure.

To the left of center in Fig. 7, arrows 77 represent the direction of gas flow and broken lines 78 represent equal-pressure contours. Gaseous matter is evolved from both anodes, and flows outward into the vacuum tank in the manner indicated by the arrows 77. Thus, there is provided a substantial pressure gradient through all of both discharge paths between the cathode and the two anodes.

To the right of center in Fig. 7, the circles containing plus and minus signs represent the predominant electrical space-charge, while the broken lines represent equipotential contours. The two anodes should be sufficiently close together that both are bathed in the same luminous, excited-gas discharge. In fact, a plasma may extend between the two anodes, as is indicated by the circles 79 containing plus signs and the equal number of circles 80 containing minus signs. The minus 50-volt equipotential contour is represented by broken line 81. Surrounding the plasma, there is a positive ion sheath, represented by circles 82. Most of the applied high voltage appears between this ion sheath and the annular cathode structure. Broken lines 83, 84, and 85 represent equipotential contours having a contour spacing of approximately 3500 volts. Immediately surrounding cathode 73, there may be a thin layer of predominantly negative space-charge, represented by circles 86, produced by electrons loosely bound to or flowing outward from the cathode.

The arrangement shown in Fig. 7, is, in effect, two electron-discharge systems combined into one. Each of these discharge systems operates in accordance with the principles of this invention, substantially as hereinbefore described.

Figure 8:
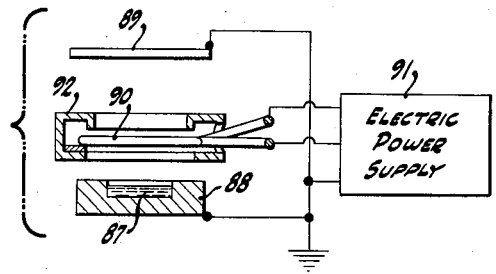
Fig. 8 is a fragmentary, vertical section illustrating another modification of the aforesaid apparatus.

This invention is also useful in evaporating materials, e.g., for the vacuum deposition of thin films and coatings. A vacuum evaporation apparatus is schematically illustrated in Fig. 8 wherein, for simplicity, the vacuum pump, vacuum tank, etc. (which may be similar to corresponding parts shown in Fig. 1) have been omitted. The evaporant 87 is held in any appropriate and suitable pan or crucible 88. An article that is to be coated with the evaporated material is represented at 89. Crucible 88 and article 89 are electrically connected to ground through their respective supporting structures (not shown).

For heating and evaporating the material 87, there is an electron-bombardment system comprising an annular cathode 90, connected to an electric power supply 91 and disposed within an annular focusing shield 92. Material 87 is heated by electron bombardment in the manner hereinbefore described. In this case the material 87 is not merely melted, but is heated to a sufficiently high temperature that a stream of considerable vapor arises from the molten surface, passes through the annular cathode structure, and collects upon article 89 to form a film or coating thereon.

Figure 9:
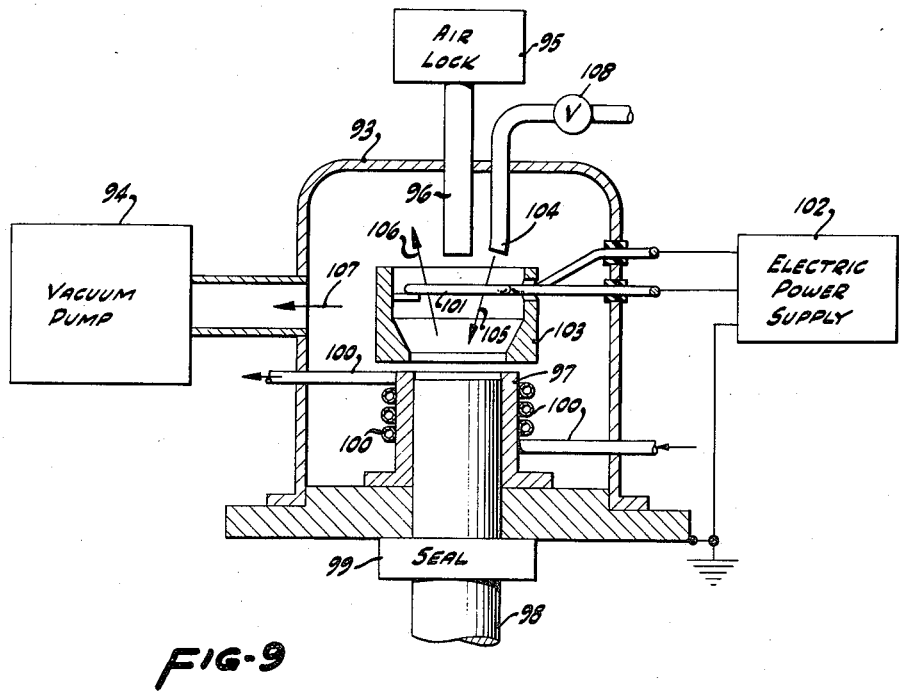
Fig. 9 is a largely schematic, vertical section illustrating still another modification.

In case the body that is to be heated does not evolve sufficient quantities of gaseous matter for carrying out the process herein disclosed, additional gaseous matter may be introduced in the vicinity of the cathode by means of an auxiliary gas supply. This is illustrated schematically in Fig. 9. Vacuum tank 93 is continuously exhausted to a low pressure by vacuum pump 94. Lumps or pellets of the material that is to be processed are introduced through an air lock 95 and a tube or chute 96. This material falls into the top of an annular mold 97, where it is heated and melted by electron bombardment. A pool of molten material forms in the top of mold 97, supported atop a solidified ingot 98 of the same material. Ingot 98 is lowered from time to time, as more material is added to the mold, and may be withdrawn from the vacuum system through a conventional vacuum seal 99. Mold 97 may be cooled by a liquid coolant circulated through a pipe 100 that encircles the mold, as shown. As the ingot is lowered, material at the bottom of the molten pool solidifies.

Electron bombardment heating is accomplished by means of an annular cathode 101, connected to an electric power supply 102 and disposed within an annular focusing shield 103. The heating operation takes place in accordance with the process hereinbefore described, except that in this case the material heated does not evolve sufficient gaseous matter for purposes of the process. This may be due either to an initial lack of gaseous matter adsorbed and absorbed by said material, or may be due to the fact that the melting operation is conducted on such a small scale and at such a slow rate that the rate of gas evolution is low, even though the percentage of evolved gas is high in proportion to the amount of material processed.

Hence, in order to provide the necessary pressure gradient for practicing the process as herein described, additional gas is introduced into the interelectrode space in the vicinity of the cathode. This may be done, for example, by permitting a small flow of gas through pipe 104 from any gas source, such as the atmosphere. The flow rate is regulated by a valve 108. The open end of pipe 104, or a nozzle attached thereto if such is provided, is directed into the interelectrode space and is aimed at approximately the center of the anode. Because of the low pressures and densities existing within the vacuum tank, gas molecules emerging from pipe 104 have long mean-free-paths, and a substantial proportion of such molecules travel in a straight line to a region in the vicinity of the anode before they collide with other gas molecules. Thus, the pipe 104, even though it is situated above the cathode structure, provides a means for introducing gas into a region in the vicinity of the anode.

Near the anode, the density of the gaseous matter is greater and the gas molecules from pipe 104 collide with other gas molecules to build up a local pressure considerably in excess of that existing in the main body of vacuum tank 93. From this local, relatively high-pressure region, gaseous matter flows upward through the annular cathode structure and out into the vacuum tank, in the same manner as with the processes hereinbefore described. In the drawing, the general direction of gas flow is indicated by arrows 105, 106 and 107.

It should be understood that this invention in its broader aspect is not limited to specific examples herein illustrated and described, and that the following claims are intended to cover all changes and modifications utilizing inventive principles herein disclosed.

What is claimed is:

1. The method of heating a body by electron bombardment, which comprises placing an electron-emitting cathode in alinement with said body and separated therefrom by an evacuated space, maintaining said body at a positive electric potential relative to said cathode so that electrons emitted by said cathode move across said space to bombard and thereby to heat said body, continually supplying gaseous matter into said space in the vicinity of said body at a sufficient rate for maintaining a substantial pressure gradient through all of said space between said body and said cathode with the highest absolute pressure adjacent to said body, and continually withdrawing said gaseous matter from the vicinity of said cathode at a sufficient rate for maintaining the average gas density within said space so low that a substantial majority of the electrons flowing from said cathode to said body experience no ionizing collisions with said gaseous matter.

2. The method of heating a body by electron bombardment, which comprises placing an electron-emitting cathode in alinement with said body and separated therefrom by an evacuated space, maintaining said body at a positive electric potential relative to said cathode so that electrons emitted by said cathode move across said space to bombard and thereby to heat said body, continuously supplying gaseous matter into said space in the immediate vicinity of said body at a sufficient rate for the formation of an ionic plasma extending outward from said body toward said cathode, said plasma having an ion density that varies as a direct function of both the electron current and the density of said gaseous matter, continuously withdrawing said gaseous matter from the vicinity of said cathode at a sufficient rate for maintaining an ionic density gradient through said plasma, with the greatest density of ions in the vicinity of said body and a decreasing density of ions toward said cathode, and regulating the emission of electrons by said cathode to maintain in the vicinity of the cathode an ion density sufficient for substantially neutralizing the electronic space charge but insufficient for producing a self-sustaining discharge.

3. The method of heating, by electron bombardment in a vacuum, a body that evolves gaseous matter when so heated, which comprises placing said body within a vacuum tank, providing within said tank an annular electron-emissive cathode separated from said body by an evacuated space, maintaining said body at a positive electric potential relative to said cathode so that electrons emitted by said cathode bombard and heat said body to produce a substantially continuous evolution of said gaseous matter, alining said cathode with said body in sufficiently close proximity thereto that a major portion of said gaseous matter evolved by said body passes through said annular cathode, continuously pumping said gaseous matter out of said vacuum tank at a sufficient rate to maintain a substantial pressure gradient between said body and said cathode, and regulating the emission of electrons by said cathode to maintain a controlled, emission-limited, electric discharge.

4. The method of heating, by electron bombardment in a vacuum, a body that evolves gaseous matter when so heated, which comprises providing an annular, thermionic cathode of larger diameter than said body, supplying through said cathode sufficient electric current to heat the same and to produce thermionic emission of electrons, disposing said cathode in alinement with said body and separated therefrom by an evacuated space that is shorter than the diameter of said cathode, maintaining said body at a positive electric potential relative to said cathode so that electrons emitted by said cathode bombard and heat said body to produce a substantially continuous but irregular evolution of said gaseous matter, continuously withdrawing said gaseous matter through said annular cathode and thereby maintaining a substantial pressure gradient between said body and said cathode, and varying both the electric potential difference between said body and said cathode and the electric current supplied to said cathode as inverse functions of the electron current between said body and said cathode to provide a controlled, emission-limited, electric discharge.

5. The method of heating a body by electron bombardment, which comprises placing said body in proximity to an electron-emissive cathode structure but separated therefrom by an evacuated space, maintaining said body at a positive electric potential relative to said cathode so that electrons emitted by said cathode bombard and heat said body, providing gaseous matter within said space at a sufficient density in the vicinity of said body for the formation of a conductive plasma that acts as a virtual anode to attract electrons emitted by said cathode and also acts as a source of positive ions which substantially neutralize the electric space charge of said electrons, and continually withdrawing said gaseous matter from the vicinity of said cathode structure at a sufficient rate to maintain a substantial gradient in the density of said ions, the ion density decreasing from said body toward said cathode so that the supply of positive ions provided by said plasma decreases upon extension of the plasma toward said cathode structure, whereby a stable, high-impedance discharge is provided with substantially complete neutralization of the electronic space-charge.

References Cited in the file of this patent
UNITED STATES PATENTS

| 2,423,729 | Ruhle | July 8, 1947 |
| 2,771,568 | Steigerwald | Nov. 20, 1956 |